(12) United States Patent
Bernat et al.

(10) Patent No.: US 10,922,265 B2
(45) Date of Patent: Feb. 16, 2021

(54) TECHNIQUES TO CONTROL REMOTE MEMORY ACCESS IN A COMPUTE ENVIRONMENT

(71) Applicant: INTEL CORPORATION, Santa Clara, CA (US)

(72) Inventors: Francesc Guim Bernat, Barcelona (ES); Karthik Kumar, Chandler, AZ (US); Nicolae Popovici, Bretten (DE); Thomas Willhalm, Sandhausen (DE)

(73) Assignee: INTEL CORPORATION, Santa Clara, CA (US)

( * ) Notice: Subject to any disclaimer, the term of this patent is extended or adjusted under 35 U.S.C. 154(b) by 720 days.

(21) Appl. No.: 15/634,128

(22) Filed: Jun. 27, 2017

(65) Prior Publication Data

US 2018/0373671 A1 Dec. 27, 2018

(51) Int. Cl.
| | |
|---|---|
| *G06F 12/00* | (2006.01) |
| *G06F 15/173* | (2006.01) |
| *G06F 12/0831* | (2016.01) |
| *G06F 9/52* | (2006.01) |
| *G06F 12/0813* | (2016.01) |
| *G06F 12/084* | (2016.01) |
| *G06F 9/46* | (2006.01) |

(52) U.S. Cl.
CPC ........ *G06F 15/17331* (2013.01); *G06F 9/467* (2013.01); *G06F 9/526* (2013.01); *G06F 12/084* (2013.01); *G06F 12/0813* (2013.01); *G06F 12/0835* (2013.01); *G06F 2212/1008* (2013.01); *G06F 2212/1052* (2013.01); *G06F 2212/621* (2013.01)

(58) Field of Classification Search
CPC .... G06F 15/17331; G06F 9/467; G06F 9/526; G06F 12/0813; G06F 12/0835; G06F 12/084; G06F 2212/1008; G06F 2212/1052; G06F 221/621
See application file for complete search history.

(56) References Cited

U.S. PATENT DOCUMENTS

| | | | | |
|---|---|---|---|---|
| 5,682,516 | A * | 10/1997 | Sarangdhar | ............. H04L 29/06 |
| | | | | 711/146 |
| 8,131,940 | B2 * | 3/2012 | Sistia | ................... G06F 12/0831 |
| | | | | 711/141 |
| 2007/0143550 | A1 * | 6/2007 | Rajwar | ................. G06F 12/084 |
| | | | | 711/146 |
| 2009/0138890 | A1 * | 5/2009 | Blake | .................. G06F 9/30087 |
| | | | | 718/106 |

* cited by examiner

*Primary Examiner* — Shawn X Gu
(74) *Attorney, Agent, or Firm* — Kacvinsky Daisak Bluni PLLC

(57) ABSTRACT

Various embodiments are generally directed to an apparatus, method and other techniques to receive a transaction request to perform a transaction with the memory, the transaction request including a synchronization indication to indicate utilization of transaction synchronization to perform the transaction. Embodiments may include sending a request to a caching agent to perform the transaction, receiving a response from the caching agent, the response to indicate whether the transaction conflicts or does not conflict with another transaction, and performing the transaction if the response indicates the transaction does not conflict with the other transaction, or delaying the transaction for a period of time if the response indicates the transaction does conflict with the other transaction.

25 Claims, 8 Drawing Sheets

Pending Transaction Entry 300

| Node 302 | Memory Range 304 | Max Retries 306 | Transaction ID 308 | Allocation Time 310 | Priority 312 |

*FIG. 3A*

Inflight Transaction Entry 350

| Transaction ID 352 | Pending Retries 354 | Payload 356 | Lock Elision ID 358 |

*FIG. 3B*

TECHNIQUES TO CONTROL REMOTE MEMORY ACCESS IN A COMPUTE ENVIRONMENT

TECHNICAL FIELD

Embodiments described herein generally include techniques to control remote memory access in a compute environment.

BACKGROUND

Multithreaded processing has been a critical technology to achieve high performance processing by utilizing parallelization. However, multithreaded processing slows down when threads need to be serialized due to memory accesses for data in a memory region. For example, two different threads may need to access data in the same hash table. Previously there was no way to predict which sections of the hash table each thread is to access. Thus, each thread would be processed in serial and would lock the entire hash table even when there may not be any overlap between accesses by the threads. This scenario is complicated when a memory access request is generated remotely, e.g. by a processor coupled via a network interface. Thus, embodiments are directed to solving these and other problems as discussed herein.

BRIEF DESCRIPTION OF THE DRAWINGS

FIG. 3A/3B illustrate examples of data structure entries.

DETAILED DESCRIPTION

Figure 1:
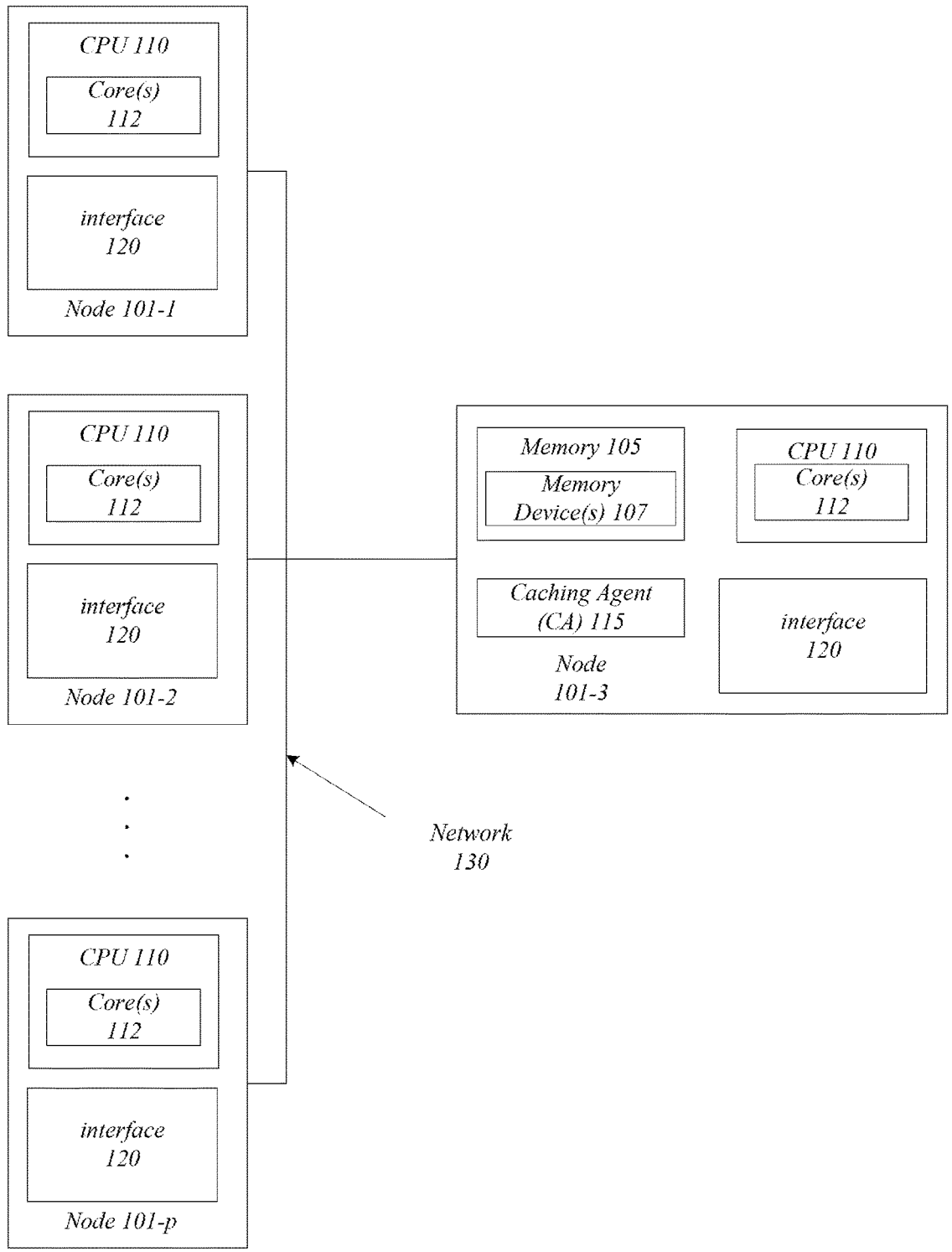
FIG. 1 illustrates an example of a first system.

Embodiments may be generally directed to control remote memory access via hardware lock elision (HLE) techniques, as discussed herein. For example, embodiments may include an interface to receive a transaction request to perform a transaction with a memory. The transaction request may include a synchronization indication to indicate utilization of transaction synchronization to perform the transaction. The interface may send a request to a caching agent to perform the transaction. The request may include a transaction identifier and a mode for the transaction that may be used by the interface and the caching agent. The caching agent may determine whether the transaction conflicts or does not conflict with another transaction, e.g. another transaction that may have been generated locally by a local core of a processor.

In embodiments, the interface may receive a response from the caching agent, the response may indicate whether the transaction conflicts or does not conflict with another transaction. The response may also include a lock elision identifier for the transaction, which may be used by the caching agent to track the transaction. For example, the caching agent may assign transaction a lock elision identifier, send the lock elision identifier to the interface. The interface may send a response with a lock elision identifier indicating the transaction associated with the lock elision identifier can be cleared by the caching agent once the transaction has been processed.

The interface may perform or cause the transaction to be performed if the response indicates the transaction does not conflict with another transaction. The interface may delay the transaction for a period of time if the response indicates the transaction does conflict with another transaction. Embodiments are not limited to this example and other details will be discussed more fully below.

Reference is now made to the drawings, wherein like reference numerals are used to refer to like elements throughout. In the following description, for purposes of explanation, numerous specific details are set forth to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example embodiment of a system 100 in which aspects of the present disclosure may be employed to control remote direct memory access. The system 100 may include a number of nodes 101-1 through 101-$p$, where $p$ may be any positive integer, that may share resources, such as the memory 105, cores 112, and so forth. The nodes 101 may be coupled via a network 130, such as a fabric network (Omnipath® or InfiniBand®) or Ethernet network with remote direct memory access (RDMA) over converged Ethernet (RoCE) capabilities. The network 130 may include one or more switches, interconnects, routers, and network equipment to support fabric or Ethernet communications. In embodiments, the switches and interconnects may communicate information and data between the nodes 101 electrically and optically, for example. Note that some of nodes 101 are illustrated having particular resources. However, embodiments are not limited in this manner.

In various embodiments, each of the nodes 101 may be embodied as any type of computing device, including a personal computing, a desktop computer, a tablet computer, a netbook computer, a notebook computer, a laptop computer, a server, server farm, blade server, or any other type of server, and so forth. In some embodiments, the nodes 101 may include memory 105 and a computing processing unit (CPU) 110 having one or more cores 112. Embodiments are not limited in this manner. In some instances, the nodes 101 may include other resources, such as storage resources, which may include persistent memory to store data and information.

In embodiments, the memory 105 may be one or more of volatile memory including random access memory (RAM) dynamic RAM (DRAM), static RAM (SRAM), double data rate synchronous dynamic RAM (DDR SDRAM), SDRAM, DDR1 SDRAM, DDR2 SDRAM, SSD3 SDRAM, single data rate SDRAM (SDR SDRAM), and so forth. Embodiments are not limited in this manner, and other memory types may be contemplated and be consistent with embodiments discussed herein. For example, the memory 105 may be a three-dimensional crosspoint memory device, or other byte addressable write-in-place nonvolatile memory devices. In embodiments, the memory devices may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory based device, a magnetic tunneling junction (MTJ) based device, a DW (Domain Wall) and SOT (Spin-Orbit Transfer) based device, a thyristor-based memory device, or a combination of any of the above, or other memory.

In embodiments, the memory 105 may include one or more memory devices 107 or memory modules capable of fitting in a memory slot, for example. The memory devices 107 include circuitry and logic capable of storing data consistent with any of the above-discussed memory 105. Embodiments are not limited in this manner.

In some embodiments, the node 101 may include one or more CPUs 110 which each may include one or more cores 112 and processing circuitry to process information for the nodes 101. The CPU 110 may be one or more of any type of computational element, such as but not limited to, a microprocessor, a processor, central processing unit, digital signal processing unit, dual-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. In some embodiments, the CPU 110 may be connected to and communicate with the other elements of the computing system via one or more interconnects, such as one or more buses, control lines, and data lines.

In embodiments, the cores 112 includes elements to read and write data in memory, such as memory 105, which may include one or more memory devices 107. In some instances, a core 112 may read/write data in memory which is co-located within the same node 101. In other instances, a core 112 may read/write data in memory that is located in a different node 101, via RDMA, for example. In one specific example, core 112 of node 101-1 may utilize RDMA to read and write data in memory 105 of node 101-3. the node 101-1 may communicate a transaction request, such as put instruction to write data into memory 105 and a get instruction to read data from memory 105. The instructions may be communicated between the nodes 101 via their respective interfaces 120 and the network 130, as will be discussed in more detail below.

In embodiments, the interface 120 may be a host fabric interface (HFI) to communicate via a network fabric or may be a network interconnect card (NIC) interface to communicate via an Ethernet network. The interface 120 may receive a transaction request to perform a transaction with memory 105. The transaction request may be received from another node 101 via the network 130 and include transaction information. The transaction information may include a synchronization indication or parameter to indicate utilization of transaction synchronization to perform the transaction. For example, the transaction request may include one or more bits to indicate that hardware lock elision (HLE) is to be used when the transaction is being processed. HLE includes a set of functions to avoid problems, such as "false sharing" and to avoid using mutex functions between threads to access shared data. The interface 120 in conjunction with a caching agent 115 may elide locks for critical sections of memory 105 and execute read/writes (gets/puts) simultaneously. As will be discussed in more detail, the caching agent 115 include hardware to detect critical sections and to track memory accesses, which may be generated by cores 112 remote and local to the memory 105. The transaction information may include other information for the transaction, include a transaction mode to indicate whether the transaction request is a put instruction or a get instruction, a retries indication to indicate a number of retries to perform the transaction, a delay value to indicate an amount of time to delay before retrying the transaction, and a priority value to indicate a priority for the transaction.

The interface 120 may also include circuitry and logic to register transactions received from remote nodes 101, e.g. nodes coupled via the network 130. The transactions may be registered in a data structure, such as a pending transaction table, and the interface 120 may keep track of received transaction requests that have not been completely processed by the caching agent 115 and memory 105.

The interface 120 may also send a request or notification to the caching agent 115 to perform a transaction using HLE to avoid mutex of shared data. The request may include information for a transaction, which may include a transaction identifier to identify the transaction and a transaction mode to indicate whether the transaction is a put or get. The request may include other information related to the transaction, such as one or more memory addresses for which to perform the transaction. In some instances, the memory addresses may be a range of memory addresses. Embodiments are not limited in this manner. In embodiments, the interface 120 may also register the transaction in a data structure, such as an inflight table. The inflight table may keep track of transaction and in the process of being processed by the caching agent 115 and memory 105.

In some embodiments, the interface 120 may receive a response from the caching agent 115; the response may indicate whether the transaction conflicts or does not conflict with another transaction. For example, the interface 120 may receive an acknowledgment from the caching agent 115 indicating that the transaction may be performed with the memory 105. In this example, the interface 120 may proceed with performing the transaction. Alternatively, the interface 120 may receive an indication that the transaction will cause a violation or conflict with another transaction. In these instances, the interface 120 may perform a delay and then retry the transaction with the caching agent 115. The interface 120 receive other information from the caching agent, such as an HLE identifier that may be used by the interface 120 and caching agent 115 to keep track of the transaction.

The interface 120 may also perform arbitration operations for transaction requests that are received from the nodes 101. For example, the interface 120 may determine whether two or more transaction received from nodes 101 will conflict or cause a violation. In the example, the node 101-3 may receive a request to get data from memory 105 from node 101-1 and receive a request to put data in memory 105 from node 101-2. The requests from the nodes 101-1 and 101-2 may have one or more overlapping memory addresses, and therefore perform the instructions will cause an or may cause bad data in memory 105.

In embodiments, the interface 120 may arbitrate the transactions to ensure that transactions do not conflict. In one example arbitration scheme, the interface 120 may determine and perform a transaction that has the highest priority. In instances where priority may not be used, e.g. transactions have the same priority, the interface 120 may perform a put (write) operation over a get (read) operation. If the operations are the same, the interface 120 may perform the smaller transaction, e.g. the transaction that affects the less amount of memory. If the transactions are the same size, the interface 120 may utilize allocation, e.g. when the transaction issued as a tie breaker. Embodiments are not limited to this arbitration scheme. In some instances, the arbitration criteria may be in a different order and may include different arbitration criteria such as the identity of the node 101 requesting the transaction.

In embodiments, a node 101 may also include a caching agent 115 to enable HLE operations between transaction requests received via the interface 120 and transaction requests generated by the cores 112 local to the memory 105, within the same node 101. For example, node 101-3 may include a caching agent 115 to perform HLE for transaction requests generated by cores 112 of node 101-3 and transaction request generated by cores 112 of other nodes, such as nodes 101-1 and 101-2.

The caching agent 115 may perform arbitration operations between the transactions received from cores 112 of a remote node 101 and cores 112 local to the caching agent 115. More specifically, the caching agent 115 may determine whether a violation or conflict between a transaction received remotely and a transaction generated locally will occur. The caching agent 115 may also notify the interface 120 of the violation, and the interface 120 may correct actions, such as delaying and retrying the transaction and halting an inflight transaction that has not been fully committed or performed with the memory 105.

FIG. 1 illustrates system 100 with nodes 101 configured with certain elements and components. However, embodiments are not limited in this manner. In examples, each of the nodes 101-p may include memory 105 having memory devices 107, and a caching agent 115 in addition to a CPU 110 having cores 112 and an interface 120. In some instances, a subset of nodes 101 may have different configurations. In another example, a node may include memory 105 having memory devices 107, a caching agent 115, and an interface 120, and may not have a CPU 110 and cores 112. In other words, a node 101 may be dedicated to performing a particular function, such as storing data in memory or processing data with cores.

Figure 2:
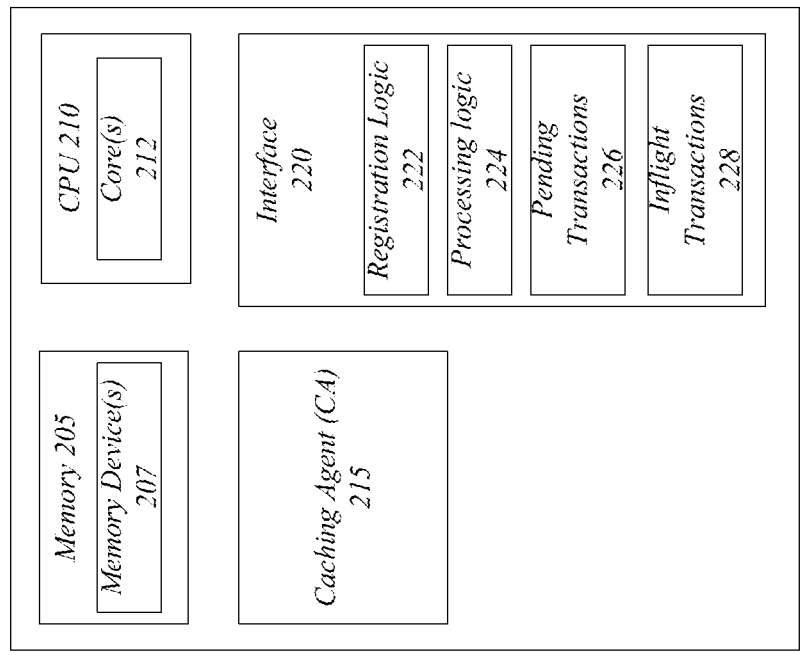
FIG. 2 illustrates an example of a node.

FIG. 2 illustrates an example of a node 201, which may be similar to or the same as any one of the nodes discussed with respect to system 100. The node 201 includes a memory 205 having memory devices 207, a CPU 210 including cores 212, and a caching agent 215. The node 201 also includes an interface 220 including components and data structures previously discussed. More specifically, the interface may include registration logic 222 and processing logic 224, which each may include circuitry and one or more instructions to process transactions communicate between the node 201 and other nodes, as will be discussed in more detail below. Node 201 is illustrated as having a limited number of elements and components for illustrative purposes only. Node 201 may include additional elements, components, circuitry, and so forth to process data and information. Moreover, interface 220 is illustrated as having a limited number of components and data structures. Similarly, interface 220 is not limited in this manner and may include additional circuitry and logic to process data communicated via a network.

In embodiments, the node 201 including the interface 220 and registration logic 222 may receive a transaction request to perform a transaction with memory 105. The transaction request may be received from another node or device and include transaction information, as previously discussed. The transaction information may include a synchronization indication or parameter to indicate utilization of transaction synchronization to perform the transaction using HLE. The transaction information may include other information for the transaction, including a transaction mode to indicate whether the transaction request is a put instruction or a get instruction, a retries indication to indicate a number of retries to perform the transaction, a delay value to indicate an amount of time to delay before retrying the transaction, and a priority value to indicate a priority for the transaction.

In embodiments, the interface 220 including the registration logic 222 may register each of the transaction requests to perform transaction received from remote nodes, e.g. nodes coupled via a network. The transactions may be registered in a data structure, such as the pending transaction data structure 226, and the registration logic 222 may keep track of received transaction requests that have not been processed by the caching agent 215. In an example, the registration logic 222 may make an entry in the pending transaction data structure 226 for each transaction request the interface 220 receives from a remote node or device. The pending transaction data structure 226 may be any type of data structure capable of storing information, such as a table, a list, an array, a record, and so forth. Further, FIG. 3A illustrates an example pending transaction entry 300 that may be entered into the pending transaction data structure 226 by the registration logic 222.

Reference will now be made FIG. 3A and the example pending transaction entry 300. The pending transaction entry 300 may store information and data related to the transaction. In the illustrated example, the pending transaction entry 300 may include a number of fields or elements to store the information. For example, the pending transaction entry 300 may include a node field 302 to store node information or an identification of the node requesting the transaction, a memory range field 304 to store memory range information or an address range associated with the transaction, a max retries field 306 to store max retry information or a number of max retries desired for the transaction, a transaction identifier field 308 to store a transaction identifier for the transaction and may be assigned by the registration logic, an allocation time field 310 to store allocation information or a timestamp of the transaction request, and a priority field 312 to store a priority indication for the transaction.

Concerning FIG. 2, the interface 220 including the processing logic 224 may perform processing operations to ensure the transaction is processed by the caching agent 215 and the memory 205. The processing logic 224 may send a request or notification to the caching agent 215 to perform a transaction using HLE. The request may include information for the transaction, which may include the transaction identifier to identify the transaction and a transaction mode to indicate whether the transaction is a put (write) or get (read). The request may include other information related to the transaction, such as one or more memory addresses for which to perform the transaction. In some instances, the memory addresses may be a range of memory addresses. Embodiments are not limited in this manner.

In embodiments, the processing logic 224 may also register the transaction in a data structure, such as the inflight transactions data structure 228, when the processing logic 224 notifies the caching agent 215 of the transaction. The inflight transactions data structure 228 may be any data structure and keep track of transaction that is in process, e.g. the caching agent 215 has been notified, but the transaction may not be fully committed to the memory 205. The processing logic 224 may also use the inflight transaction data structure 228 to track the number of retries for the transaction that have been attempted. More specifically, the processing logic 224 may receive an indication that a transaction violates HLE or conflicts with another transaction, wait a period of time, and perform a retry to have the transaction processed. After each retry, the processing logic 224 may update an entry associated with the transaction in the inflight transactions data structure 228 to indicate the retry. The inflight data structure 228 may hold an entry for each of the transactions that are inflight.

FIG. 3B illustrates one example of an inflight transaction entry 350 having a number of fields to track information relating to a particular transaction. For example, the inflight transaction entry 350 may include a transaction identifier field 352 to include a transaction identifier of the transaction, which may be the same transaction identifier in the pending transactions data structure 226. The inflight transaction entry 350 may also include a pending retries field 354 that may track the number of retries the particular transaction has remaining before a request node receives a failure indication. Note that in some instances, the pending retries field 354 may track the number of attempts that have been made, and embodiments are not limited in this manner. The inflight transactions entry 350 may also include a payload field 356 that may include the payload of the transaction, e.g. the data to be writing to memory 205 or read from memory 205. As will be discussed in more detail below, data may be broken up into segments when being read from memory 205 or written to the memory 205. The inflight transactions entry 350 may also include an lock elision identifier field 358 that may be an identifier provided by the caching agent 215. Note that FIG. 3B illustrates one example of an inflight transaction entry 350, and embodiments are not limited in this manner.

With reference back to FIG. 2, the processing logic 224 may receive a response from the caching agent 215; the response may indicate whether the transaction conflicts or does not conflict with another transaction and may also include the lock elision identifier included in field 358. In one example, the processing logic 224 may receive an acknowledgment from the caching agent 215 indicating that the transaction may be performed with the memory 205. In this example, the processing logic 224 may proceed with performing the transaction, e.g. the processing logic 224 may perform one or more reads to get data from memory 205, or the processing logic 224 may perform one or more writes to put data in the memory 205. Alternatively, the processing logic 224 may receive an indication that the transaction will cause a violation or conflict with another transaction. The processing logic 224 may perform a delay, e.g. wait a specified period of time, and then retry the transaction with the caching agent 215. The processing logic 224 may update entries relating to the transaction in the inflight transaction data structure 228, including one or more of retry information and payload information.

The processing logic 224 may provide a response to the requesting node for each of the transaction. If the transaction cannot be completed before the maximum permitted a number of retries are attempted, the processing logic 224 may send a notification to the requesting node that the transaction failed and cannot be completed. If the transaction is performed, the processing logic 224 may provide an acknowledge that the transaction was completed. In the case of a get or read, the processing logic 224 may provide the data from the addresses requested by the node. In embodiments, the processing logic 224 may also remove transactions from the data structures 226 and 228 once the transaction is complete or has failed after a maximum number of retries. Embodiments are not limited in this manner.

In embodiments, the processing logic 224 may also perform arbitration operations for transaction requests that are received from remote nodes. For example, the processing logic 224 may determine whether two or more transactions received from nodes will conflict or cause a violation. For example, the processing logic 224 may determine that requests conflict because they include one or more overlapping memory addresses to get or put data. The processing logic 224 may arbitrate the transactions to ensure that transactions do not conflict before sending them to the caching agent 215 for processing. In one example arbitration scheme, the processing logic 224 may determine and perform a transaction that has the highest priority. In instances where priority may not be used, e.g. transactions have the same priority, the processing logic 224 may perform a put (write) operation over a get (read) operation. If the operations are the same, the processing logic 224 may perform the smaller transaction that conflict, e.g. the transaction that affects the less amount of memory. If the transactions are the same size, the processing logic 224 may utilize allocation times, e.g. when the transaction issued as a tie breaker. Embodiments are not limited to this arbitration scheme. In some instances, the arbitration criteria may be in a different order and may include different arbitration criteria.

Figure 4:
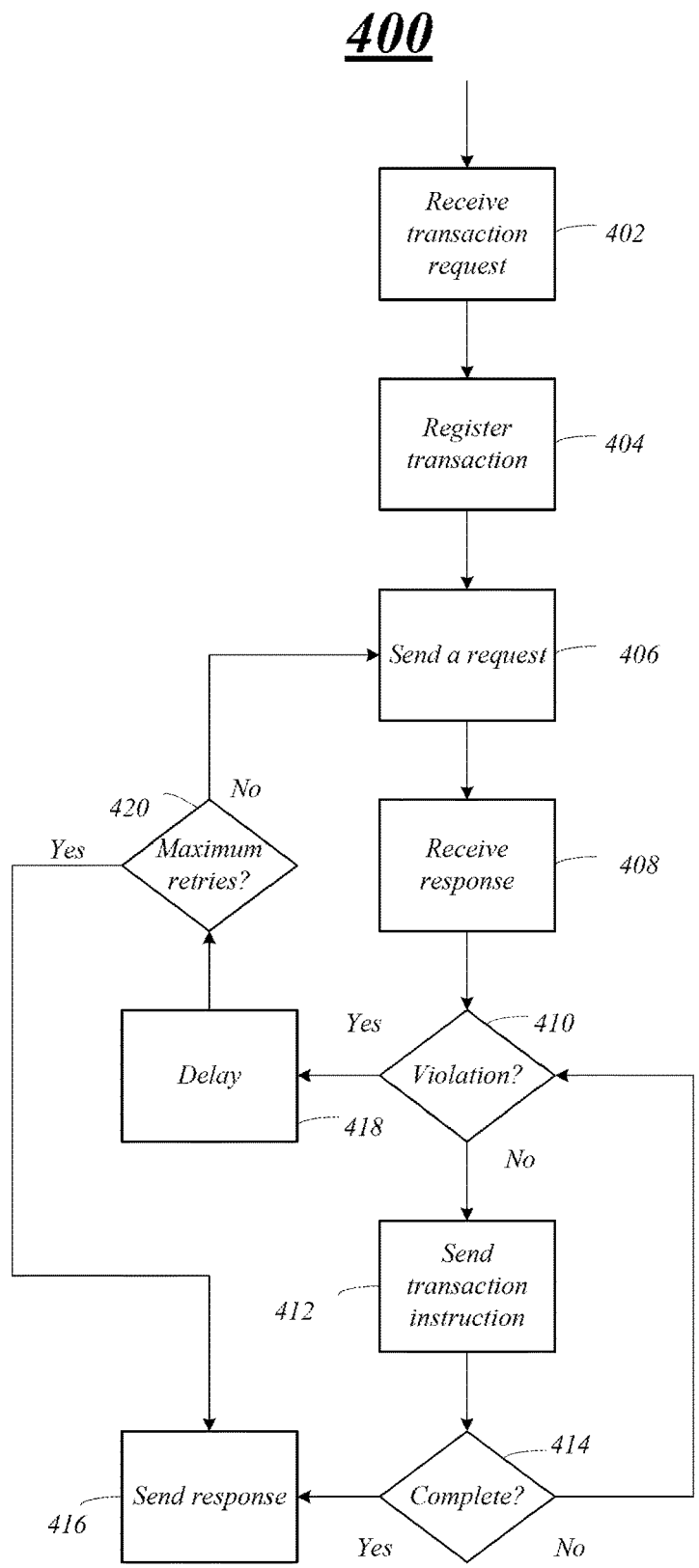
FIG. 4 illustrates an example of a first logic flow.

FIG. 4 illustrates an example of a first logic flow 400 that may be representative of some or all of the operations executed by one or more embodiments described herein. For example, the logic flow 400 may illustrate operations performed by a node, as described herein.

At block 402, the logic flow 400 includes receiving a transaction request to perform a transaction with memory. The transaction request may be received from another (remote) node or device and include transaction information, as previously discussed. The transaction information may include information with respect to the transaction and enable an interface and caching agent to process the transaction for the remote node. Further and at block 404, the logic flow 400 includes registering the transaction of the transaction request. The transaction may be registered in a data structure, such as the pending transaction data structure 226 of FIG. 2. Further and a block 404, the logic flow 400 may also determine whether the received transaction request conflicts or violates with any other received transaction requests. If the received transaction conflicts with another, arbitration operations may be performed to determine which transaction is to be performed first, as previously discussed.

At block 406, the logic flow 400 may include sending a request or notification to the caching agent and registering the transaction. The request may include information for the transaction, which may include the transaction identifier to identify the transaction and a transaction mode to indicate whether the transaction is a put (write) or get (read). The request may include other information related to the transaction, such as one or more memory addresses for which to perform the transaction. In some instances, the memory addresses may be a range of memory addresses. Embodiments are not limited in this manner. Moreover, the transaction may be registered in a data structure, such as the inflight transactions data structure 228.

At block 408, the logic flow may include receiving a response from the caching agent; the response may indicate whether the transaction conflicts or does not conflict with another transaction generated by a local core. The response may also include an lock elision identifier generated by the caching agent for the transaction. In one example, an interface may receive an acknowledgment from the caching agent indicating that the transaction may be performed with the memory. Alternatively, an interface may receive an indication that the transaction will cause a violation or conflict with another transaction.

At decision block 410, the logic flow 400 may include whether a violation has occurred for the transaction or not based on the response. If a violation has occurred, the logic flow 400, at block 418, may perform a delay, e.g. wait a specified period of time. The logic flow 400 may include determining whether a maximum number of retries have been attempted at block 420. If the maximum number of retries have been attempted, the logic flow 400 may send a response at block 416. The response may indicate that the transaction failed or could not be completed. IF the maximum number of retries have not been attempted, then a retry may be performed by repeating blocks 406-410. The interface may update entries relating to the transaction in the inflight transaction data structure, including one or more of retry information and payload information.

If a violation has not occurred, the logic flow 400, at block 412, may proceed with performing the transaction, e.g. sending a transaction instruction to the caching agent and memory. The transaction instruction may be a put or get instruction. At block 414, the logic flow 400 may include a determining whether the transaction is complete, e.g. all of the data is written into memory for a put instruction or all of the data is retrieved for a get instruction. If the transaction is not complete at block 414, the logic flow 400 may include determining whether the transaction is now in violation at block 410. In an example, the caching agent may receive a transaction from a local processing core while the remote transaction is being processed, but is not fully committed. In some instances, the caching agent may determine that the transaction inflight or in-process conflicts with the transaction received from a local core. The caching agent may notify the interface of the violation, and the interface may halt the transaction. Blocks 418, 420, and so forth may be repeated until the transaction is complete or the maximum number of retries performed. If the transaction is complete at block 414, the logic flow 400 may include sending a response to the requesting node at block 416. The response may include an indication that the transaction completed. The response may also include data for a get instruction. Embodiments are not limited in this manner.

FIG. 4 illustrates certain operations occurring in a particular order. However, embodiments are not limited in this manner. In some instances, one or more of the operations may occur before or after other operations, and FIG. 4 should be viewed in a limiting manner.

Figure 5:
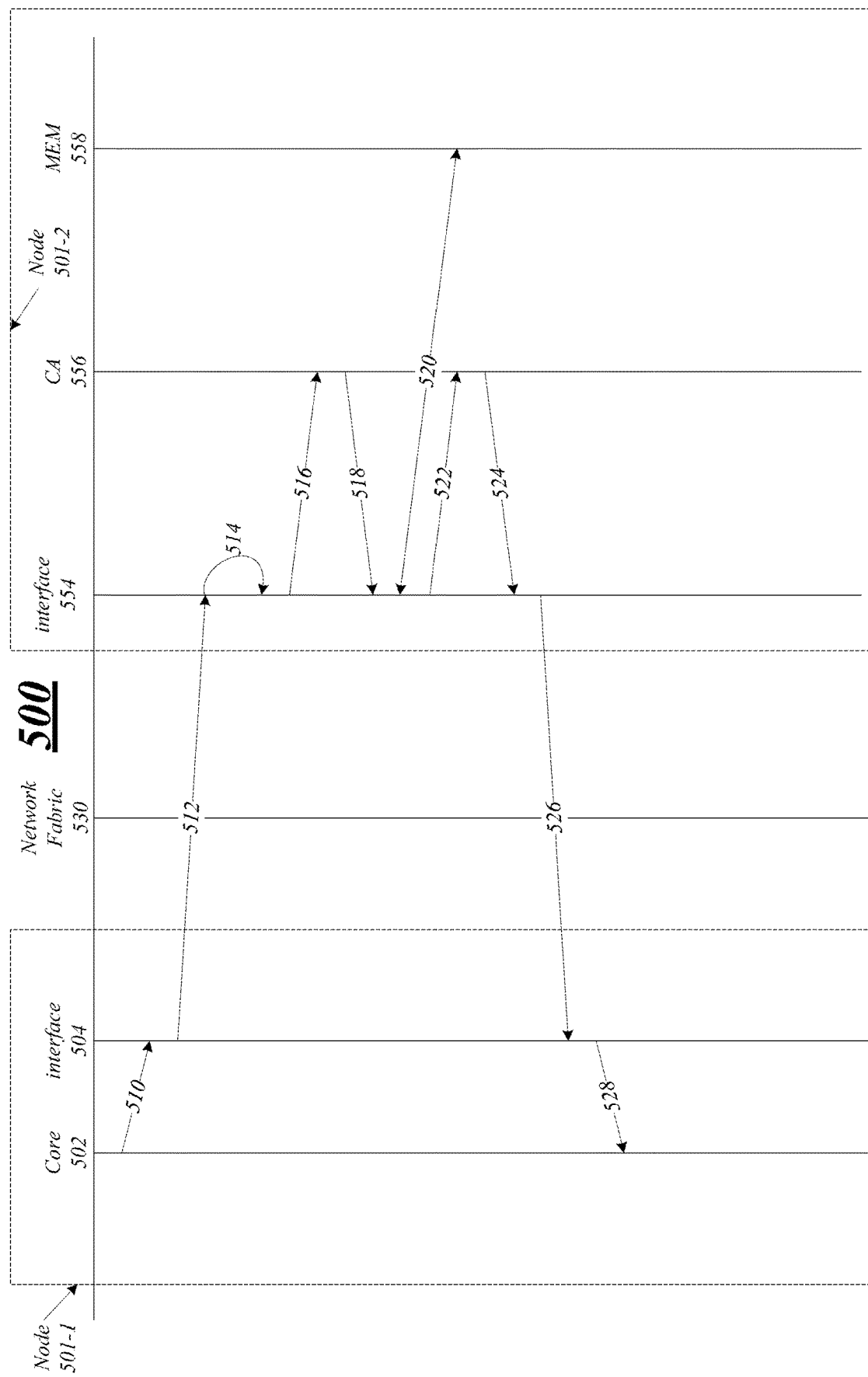
FIG. 5 illustrates an example of a first processing flow.

FIG. 5 illustrates an example of a first processing flow 500 that may be representative of some or all of the operations executed by one or more embodiments described herein. For example, the processing flow 500 may illustrate operations performed between nodes 501-1 and 501-2 to process an RDMA transaction request. In the illustrated example, node 501-1 may be remote from node 502-1 in that they may be coupled via a network 530 through respective interfaces 504 and 554. Node 501-1 may include one or more cores 502 and interface 504. Node 501-2 may include one or more cores (not shown), interface 554, a caching agent 556, and memory 558. As will be discussed in more detail below, FIG. 5 illustrates an example in which a transaction request is processed without any violations.

At line 510, a core 502 may generate and send a transaction request to interface 504. The transaction request may be a put or get transaction request and include transaction information. The transaction information may include an address range, a payload (for a put), a synchronization indication, a maximum number of retries, a delay value, and a priority. The transaction information may include an identifier for the transaction.

The interface 504 may receive the transaction request and send it to node 501-2 via the network 530 at line 512. In some instances, the interface 504 may register the transaction in a data structure to track the transaction for core 502. At line 514, interface 554 may receive the transaction request and register the transaction. For example, the interface 554 may make an entry in a pending transaction data structure (not shown) to register the transaction.

At line 516, the interface 554 may notify and send a request to the caching agent 556. The request may include an identifier for the transaction and a mode for the transaction. The caching agent 556 may register the transaction, determine if it violates another transaction, and send a response to the interface 554 at line 518. Moreover, at line 518, the interface 554 may receive the response and register the transaction in an inflight transaction data structure, which may include an lock elision identifier.

In the illustrated example, the transaction may not be in violation of another transaction. At line 520, the interface 554 may initiate and perform the transaction. For a put transaction, the interface 554 may send one or more write instructions with data to be written in memory 558, and the memory 558 may write the data in a specified address range. For a get transaction, the interface 554 may send one or more read instructions to read data from memory 558, and the memory 558 may respond with the data from the specified address ranges.

The transaction may complete, and at line 522, the interface 554 may send a release indication to the caching agent 556 to release the transaction. The inflight transaction entry for the transaction may be removed, for example. The release indication may include the lock elision identifier previously generated by the caching agent 556.

At line 524, the caching agent 556 may send, and the interface 554 may receive an acknowledgment. The interface 554 may generate a response, which may include acknowledgment, a transaction identifier, and a payload (for a put instruction). At line 526, interface 554 may send the response to interface 504 via the network 530. At line 528, the interface 504 may receive the response and send it to the core 502.

Figure 6:
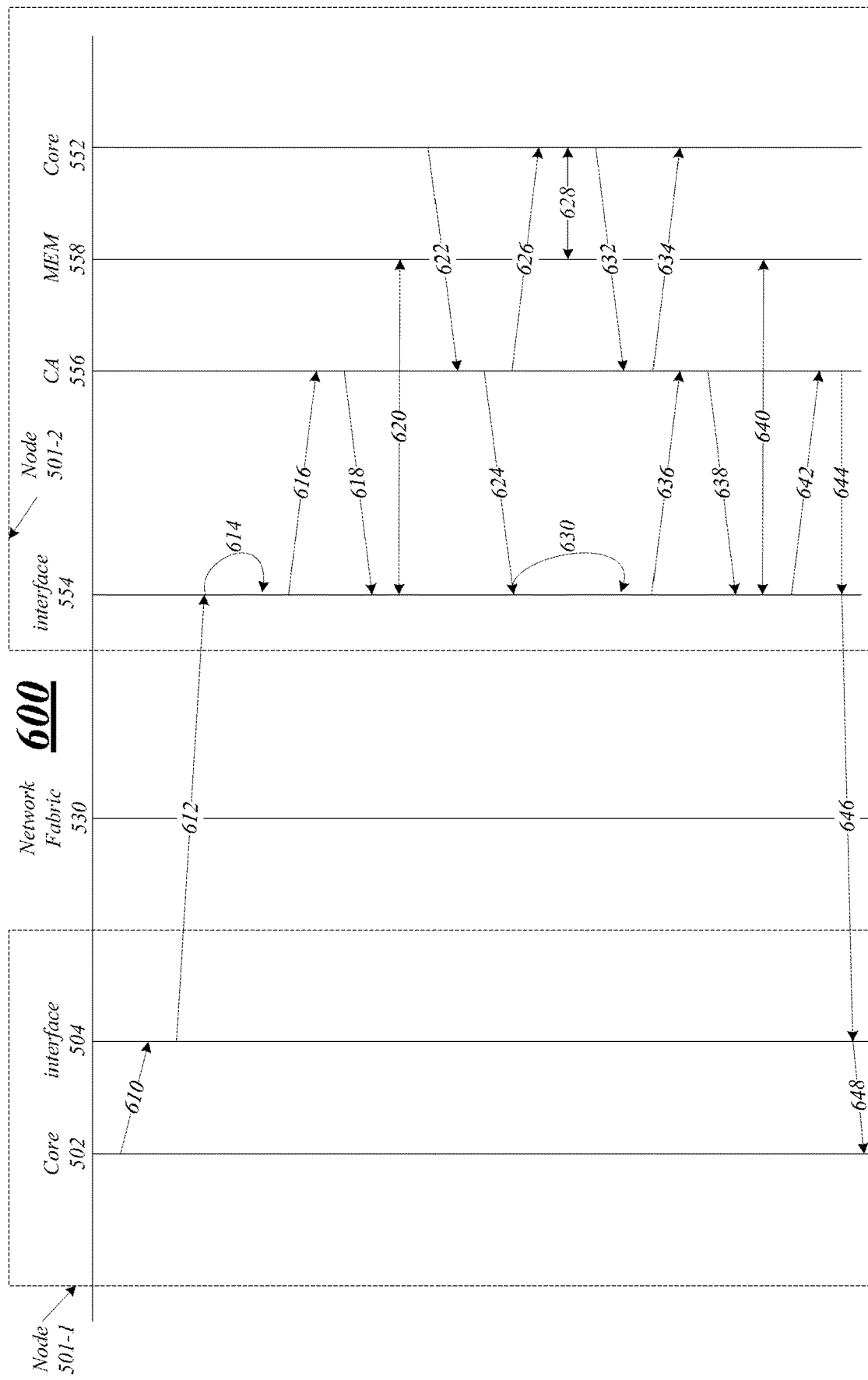
FIG. 6 illustrates an example of a second processing flow.

FIG. 6 illustrates an example of a second logic flow 600 that may be representative of some or all the operations executed by one or more embodiments described herein. For example, the processing flow 600 may illustrate operations performed between nodes 501-1 and 501-2 to process an RDMA transaction request which may cause one or more violations. In the illustrated example, node 501-1 may be remote from node 502-1 in that they may be coupled via a network 530 through respective interfaces 504 and 554. Node 501-1 may include one or more cores 502 and interface 504. Node 501-2 may include one or more cores 552, interface 554, a caching agent 556, and memory 558.

At line 610, a core 502 may generate and send a transaction request to interface 504. The transaction request may be a put or get transaction request and include transaction information. The transaction information may include an address range, a payload (for a put), a synchronization indication, a maximum number of retries, a delay value, and a priority. The transaction information may include an identifier for the transaction.

The interface 504 may receive the transaction request and send it to node 501-2 via the network 530 at line 612. The interface 504 may register the transaction in a data structure to track the transaction for core 502. At line 614, interface 554 may receive the transaction request and register the transaction. For example, the interface 554 may make an entry in a pending transaction data structure (not shown) to register the transaction.

At line 616, the interface 554 may notify and send a request to the caching agent 556. The request may include an identifier for the transaction and a mode for the transaction. The caching agent 556 may register the transaction, determine if it violates another transaction, and send a response to the interface 554 at line 618. Moreover, at line 618, the interface 554 may receive the response and register the transaction in an inflight transaction data structure, which may include an lock elision identifier.

In the illustrated example, the transaction is not in violation of another transaction at line 618. Thus, at line 620, the interface 554 may initiate and perform the transaction. For a put transaction, the interface 554 may send one or more write instructions with data to be written in memory 558, and the memory 558 may write the data in a specified address range. For a get transaction, the interface 554 may send one or more read instructions to read data from memory 558, and the memory 558 may respond with the data from the specified address ranges.

In the illustrated example of FIG. 6, core 552 of node 501-2 may send a request to perform a transaction to the caching agent 556. The request may include an identifier for the transaction and a mode for the transaction. The request may also include an address range for the request. The transaction may be a get read data from memory 558 for core 552 or put transaction to write data to memory 558 for core 552. The caching agent may receive a request at line 622 and determine whether the transaction from core 552 conflicts or causing a violation with any other transaction, including the inflight transaction from node 501-1. In some embodiments, the caching agent 556 may use similar arbitration operations, as discussed above, to determine if a violation exists. If a violation does not occur, the caching agent 556 may permit two or more transaction to proceed with the memory 558 in parallel.

In this example, the transaction from core 502 conflicts and violates the transaction from core 552. The caching agent 556 may send a notification or violation indication to the interface 554 at line 624. The interface 554 may receive the notification of the violation and halt the transaction from core 502.

At line 626, the caching agent 556 may send an acknowledgment to core 552 indicating to proceed with the transaction in this example. The acknowledgment to core 552 may include an lock elision identifier generated and provided by the caching agent 556. Note in a different example, the transaction may conflict with another transaction, and in these cases, the caching agent 556 may send a notification to core 552. The core 552 may then delay and wait for the conflict to resolve before performing the transaction.

At line 628, the core 552 may initiate the transaction and may perform one or more gets to read data from memory 558 or one or more puts to write data to memory 558 based on the mode of the transaction. The core 552 may complete the transaction with memory 558, and at line 632, the core 552 may send a notification to the caching agent 556 indicating the completion of the transaction. The notification may include the lock elision identifier previously provided by the caching agent 556. At line 634, the caching agent 556 may send an acknowledgment to the core 552.

At line 630, the interface 554 may perform a delay or wait a period of time for the transaction from core 502. At line 636, the interface 554 may perform a retry and send a request to the caching agent 556 for the transaction from the core 502 that was halted. If the conflicting transaction has not completed, the caching agent 556 may send back a notification indicating as such, and the interface 554 may perform another delay and retry. The interface 554 may repeat this process until the conflicting transaction, or the maximum number of retries is reached for the transaction. In this example, the conflicting transaction from core 552 is complete.

At line 638, the caching agent 556 may send an acknowledgment to interface 554 indicating the interface 554 may proceed with the transaction. At line 640, the interface 554 may proceed with, and in some instances, start over the transaction for core 502 that was previously in violation. As discussed, the transaction may be completed by performing a number of reads or writes based on the mode of the transaction.

At line 642, the transaction may complete, and the interface 554 may send a release notification including the lock elision identifier for the transaction to the caching agent 556. At line 644, the interface 554 may receive an acknowledgment from the caching agent 556, which may also include the lock elision identifier. At line 646, the interface 554 may send a response to interface 504, which may include a payload (data) if the transaction was a get. Moreover, at line 648, the interface 504 may send the response to core 502. FIG. 6 illustrates one or more processing operations occurring in particular order; however, embodiments are not limited in this manner. In some embodiments, the operations may occur in a different order and be consistent with embodiments discussed herein.

Figure 7:
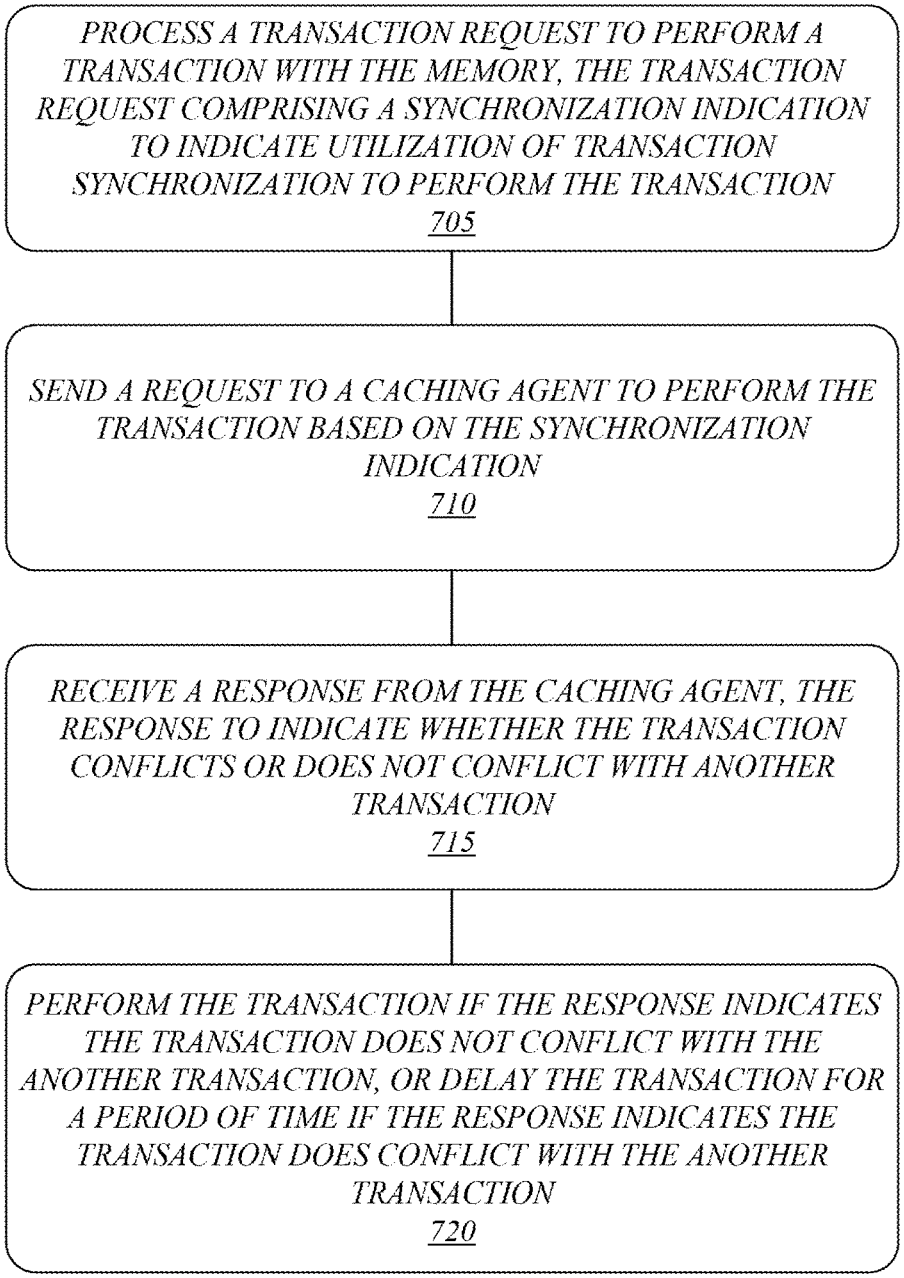
FIG. 7 illustrates an example of a second logic flow.

FIG. 7 illustrates an example of a first logic flow 700 that may be representative of some or all of the operations executed by one or more embodiments described herein. For example, the logic flow 700 may illustrate operations performed by a node, as described herein.

At block 705, the logic flow 700 may include receiving and/or processing a transaction request to perform a transaction with the memory; the transaction request includes a synchronization indication to indicate utilization of transaction synchronization to perform the transaction, such as HLE. At block 710, the logic flow 700 includes sending a request to a caching agent to perform the transaction based on the synchronization indication indicating utilization of the transaction synchronization. The request may include a transaction identifier and a mode for the transaction.

At block 715, the logic flow 700 includes receiving a response from the caching agent, the response to indicate whether the transaction conflicts or does not conflict with another transaction. In embodiments, the response may also include an lock elision identifier for the transaction, which may be used by the caching agent to track the transaction. At block 720, the logic flow 700 includes performing the transaction if the response indicates the transaction does not conflict with the other transaction or delaying the transaction for a period of time if the response indicates the transaction does conflict with another transaction.

Figure 8:
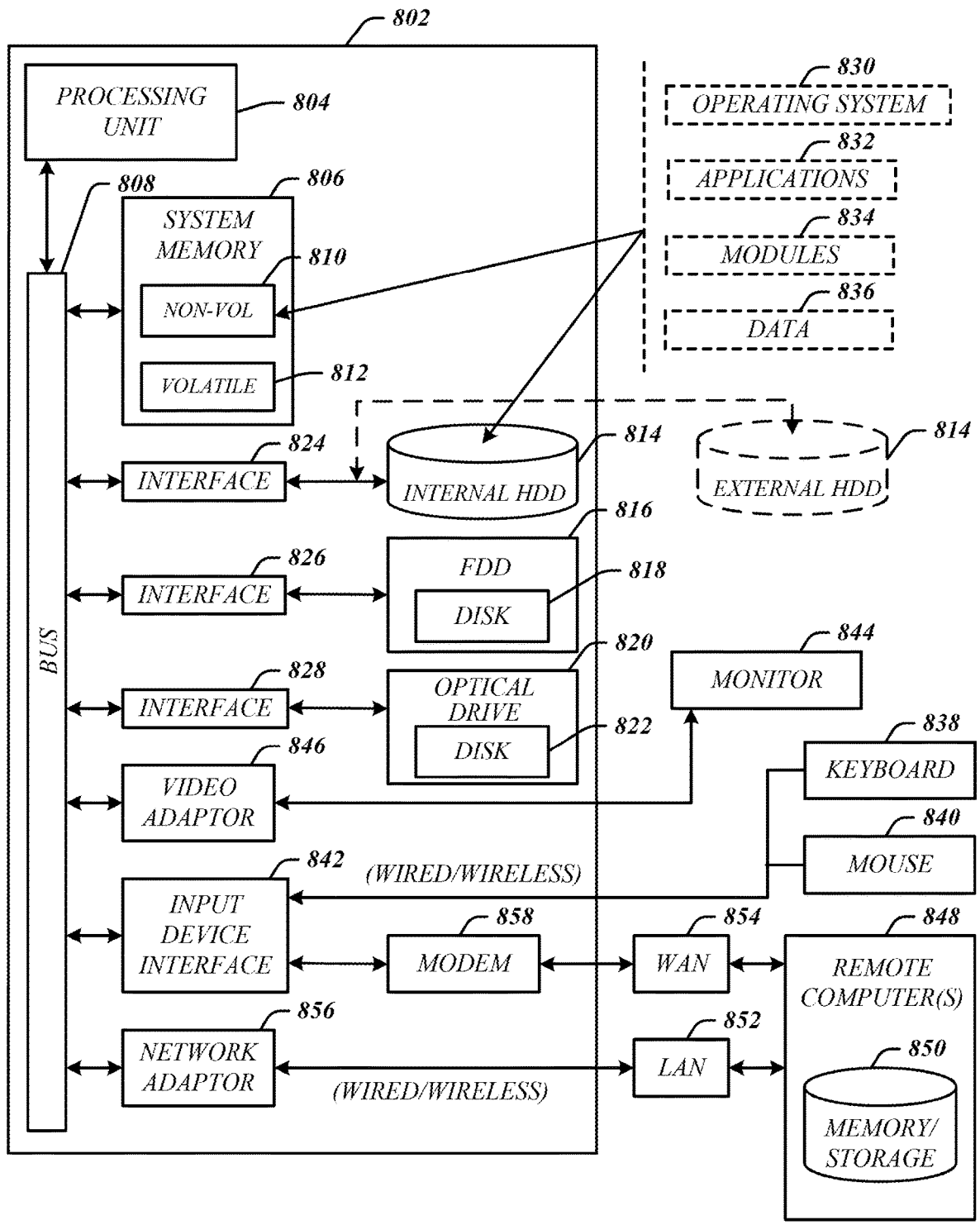
FIG. 8 illustrates an example embodiment of a computing architecture.

FIG. 8 illustrates an embodiment of an exemplary computing architecture 800 suitable for implementing various embodiments as previously described. In embodiments, the computing architecture 800 may include or be implemented as part of a node, for example.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and thread of execution, and a component can be localized on one computer and distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes a processing unit 804, a system memory 806 and a system bus 808. The processing unit 804 can be any of various commercially available processors.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by an HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and components of the system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and larger networks, for example, a wide area network (WAN) 854. Such LAN and WAN networking environments are commonplace in offices and companies and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-8 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-three (1-33) provided below are intended to be exemplary and non-limiting.

In a first example, a system, a device, an apparatus, and so forth may include memory, and an interface coupled with the memory, the interface including logic and circuitry, the logic operable on the circuitry to process a transaction request to perform a transaction with the memory, the transaction request including a synchronization indication to indicate utilization of transaction synchronization to perform the transaction, send a request to a caching agent to perform the transaction based on the transaction synchronization, receive a response from the caching agent, the response to indicate whether the transaction conflicts or does not conflict with another transaction, and perform the transaction if the response indicates the transaction does not conflict with the other transaction, or delay the transaction for a period of time if the response indicates the transaction does conflict with the other transaction.

In a second example and in furtherance of the first example, a system, a device, an apparatus, and so forth may include the circuitry to receive the transaction request from a node via a fabric or network coupled with the interface, the transaction request including one or more of a memory range, a retry indicator, a delay value, and a priority value.

In a third example and in furtherance of the previous examples, a system, a device, an apparatus, and so forth may include the transaction request including a remote direct memory access (RDMA) instruction.

In a fourth example and in furtherance of the previous examples, a system, a device, an apparatus, and so forth may include the transaction request including a put instruction to write data to the memory or a get instruction to read data from the memory.

In a fifth example and in furtherance of the previous examples, a system, a device, an apparatus, and so forth may include the circuitry to register the transaction in a pending transactions data structure upon receipt of the transaction request, the pending transactions data structure to store one or more of a node identification, a memory range, a retry indicator, a delay value, a transaction identifier, an allocation time, and a priority value for the transaction.

In a sixth example and in furtherance of the previous examples, a system, a device, an apparatus, and so forth may include the circuitry to receive a lock elision identifier from the caching agent with the response, and register the transaction in an inflight transactions data structure, the inflight transactions data structure to store one or more of a node identification, a pending retries value, a payload, and the lock elision identifier for the transaction.

In a seventh example and in furtherance of the previous examples, a system, a device, an apparatus, and so forth may include perform a retry attempt of the transaction subsequent the period of time if the response indicates the transaction does conflict another transaction, the retry attempt to cause the circuitry to send a second request to the caching agent to perform the transaction, receive a second response to indicate whether the transaction conflicts or does not conflict with another transaction, and perform the transaction if the second response indicates the transaction does not conflict with the other transaction, or delay the transaction for a period of time if the second response indicates the transaction does conflict with the other transaction.

In an eighth example and in furtherance of the previous examples, a system, a device, an apparatus, and so forth may include the circuitry to receive another response while performing the transaction indicating the transaction conflicts with another transaction, and halt the transaction in response to receiving the other response.

In a ninth example and in furtherance of the previous examples, a system, a device, an apparatus, and so forth may include the caching agent, and one or more processing cores operable to generate the other transactions.

In a tenth example and in furtherance of the previous examples, a computer-implemented method may include receiving, at an interface, a transaction request to perform a transaction with a memory, the transaction request including a synchronization indication to indicate utilization of transaction synchronization to perform the transaction, sending a request to a caching agent to perform the transaction, receiving a response from the caching agent, the response to indicate whether the transaction conflicts or does not conflict with another transaction, and performing the transaction if the response indicates the transaction does not conflict with the other transaction, or delay the transaction for a period of time if the response indicates the transaction does conflict with the other transaction.

In an eleventh example and in furtherance of the previous examples, a computer-implemented method may include receiving the transaction request from a node via a fabric or network coupled with the interface, the transaction request including one or more of a memory range, a retry indicator, a delay value, and a priority value.

In a twelfth example and in furtherance of the previous examples, a computer-implemented method may include the transaction request including a remote direct memory access (RDMA) instruction.

In a thirteenth example and in furtherance of the previous examples, a computer-implemented method may include the transaction request including a put instruction to write data to the memory or a get instruction to read data from the memory.

In a fourteenth example and in furtherance of the previous examples, a computer-implemented method may include registering the transaction in a pending transactions data structure upon receipt of the transaction request, the pending transactions data structure to store one or more of a node identification, a memory range, a retry indicator, a delay value, a transaction identifier, an allocation time, and a priority value for the transaction.

In a fifteenth example and in furtherance of the previous examples, a computer-implemented method may include receiving a lock elision identifier from the caching agent with the response, and registering the transaction in an inflight transactions data structure, the inflight transactions data structure to store one or more of a node identification, a pending retries value, a payload, and the lock elision identifier for the transaction.

In a sixteenth example and in furtherance of the previous examples, a computer-implemented method may include performing a retry attempt of the transaction subsequent the period of time if the response indicates the transaction does conflict another transaction, the retry attempt including sending a second request to the caching agent to perform the transaction, receiving a second response to indicate whether the transaction conflicts or does not conflict with another transaction, and performing the transaction if the second response indicates the transaction does not conflict with the other transaction, or delay the transaction for a period of time if the second response indicates the transaction does conflict with the other transaction.

In a seventeenth example and in furtherance of the previous examples, a computer-implemented method may include receiving another response while performing the transaction indicating the transaction conflicts with another transaction, and halting the transaction in response to receiving the other response.

In an eighteenth example and in furtherance of the previous examples, a non-transitory computer-readable storage medium, including a plurality of instructions, that when executed, enable processing circuitry of an interface to receive a transaction request to perform a transaction with a memory, the transaction request including a synchronization indication to indicate utilization of transaction synchronization to perform the transaction, send a request to a caching agent to perform the transaction, receive a response from the caching agent, the response to indicate whether the transaction conflicts or does not conflict with another transaction, and perform the transaction if the response indicates the transaction does not conflict with the other transaction, or delay the transaction for a period of time if the response indicates the transaction does conflict with the other transaction.

In a nineteenth example and in furtherance of the previous examples, including a plurality of instructions, that when executed, enable processing circuitry to receive the transaction request from a node via a fabric or network coupled with the interface, the transaction request including one or more of a memory range, a retry indicator, a delay value, and a priority value.

In a twentieth example and in furtherance of the previous examples, the transaction request including a remote direct memory access (RDMA) instruction.

In a twenty-first example and in furtherance of the previous examples, the transaction request including a put instruction to write data to the memory or a get instruction to read data from the memory.

In a twenty-second example and in furtherance of the previous examples, including a plurality of instructions, that when executed, enable processing circuitry to register the transaction in a pending transactions data structure upon receipt of the transaction request, the pending transactions data structure to store one or more of a node identification, a memory range, a retry indicator, a delay value, a transaction identifier, an allocation time, and a priority value for the transaction.

In a twenty-third example and in furtherance of the previous examples, including a plurality of instructions, that when executed, enable processing circuitry to receive a lock elision identifier from the caching agent with the response, and register the transaction in an inflight transactions data structure, the inflight transactions data structure to store one or more of a node identification, a pending retries value, a payload, and the lock elision identifier for the transaction.

In a twenty-fourth example and in furtherance of the previous examples, including a plurality of instructions, that when executed, enable processing circuitry to perform a retry attempt of the transaction subsequent the period of time if the response indicates the transaction does conflict another transaction, the retry attempt including send a second request to the caching agent to perform the transaction, receive a second response to indicate whether the transaction conflicts or does not conflict with another transaction, and perform the transaction if the second response indicates the transaction does not conflict with the other transaction, or delay the transaction for a period of time if the second response indicates the transaction does conflict with the other transaction.

In a twenty-fifth example and in furtherance of the previous examples, including a plurality of instructions, that when executed, enable processing circuitry to receive another response while performing the transaction indicating the transaction conflicts with another transaction, and halt the transaction in response to receiving the other response.

In a twenty-sixth example and in furtherance of the previous examples, a system, a device, an apparatus, and so forth may include means for receiving a transaction request to perform a transaction with a memory, the transaction request including a synchronization indication to indicate utilization of transaction synchronization to perform the transaction, means for sending a request to a caching agent to perform the transaction, means for receiving a response from the caching agent, the response to indicate whether the transaction conflicts or does not conflict with another transaction, and means for performing the transaction if the response indicates the transaction does not conflict with the other transaction, or means for delaying the transaction for a period of time if the response indicates the transaction does conflict with the other transaction.

In a twenty-seventh example and in furtherance of the previous examples, a system, a device, an apparatus, and so forth may include means for receiving the transaction request from a node via a fabric or a network, the transaction request including one or more of a memory range, a retry indicator, a delay value, and a priority value.

In a twenty-eighth example and in furtherance of the previous examples, a system, a device, an apparatus, and so forth may include means for processing the transaction request including a remote direct memory access (RDMA) instruction.

In a twenty-ninth example and in furtherance of the previous examples, a system, a device, an apparatus, and so forth may include means for processing the transaction request including a put instruction to write data to the memory or a get instruction to read data from the memory.

In a thirtieth example and in furtherance of the previous examples, a system, a device, an apparatus, and so forth may include means for registering the transaction in a pending transactions data structure upon receipt of the transaction request, the pending transactions data structure to store one or more of a node identification, a memory range, a retry indicator, a delay value, a transaction identifier, an allocation time, and a priority value for the transaction.

In a thirty-first example and in furtherance of the previous examples, a system, a device, an apparatus, and so forth may include means for receiving a lock elision identifier from the caching agent with the response, and means for registering the transaction in an inflight transactions data structure, the inflight transactions data structure to store one or more of a node identification, a pending retries value, a payload, and the lock elision identifier for the transaction.

In a thirty-second example and in furtherance of the previous examples, a system, a device, an apparatus, and so forth may include means for performing a retry attempt of the transaction subsequent the period of time if the response indicates the transaction does conflict another transaction, the retry attempt including sending a second request to the caching agent to perform the transaction, receiving a second response to indicate whether the transaction conflicts or does not conflict with another transaction, and performing the transaction if the second response indicates the transaction does not conflict with the other transaction, or delay the transaction for a period of time if the second response indicates the transaction does conflict with the other transaction.

In a thirty-third example and in furtherance of the previous examples, a system, a device, an apparatus, and so forth may include means for receiving another response while performing the transaction indicating the transaction conflicts with another transaction, and means for halting the transaction in response to receiving the other response.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "including" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   memory;
   an interface coupled with the memory, the interface comprising logic and circuitry, the logic operable on the circuitry to:
   process a transaction request to perform a transaction with the memory, the transaction request comprising a synchronization indication to indicate utilization of transaction synchronization to perform the transaction,
   send a request to a caching agent to perform the transaction based on the synchronization indication,
   receive a response from the caching agent, the response to indicate whether the transaction conflicts or does not conflict with another transaction, and
   perform the transaction if the response indicates the transaction does not conflict with another transaction, or delay the transaction for a period of time if the response indicates the transaction does conflict with another transaction.

2. The apparatus of claim 1, the circuitry to receive the transaction request from a node via a fabric or network coupled with the interface, the transaction request comprising one or more of a memory range, a retry indicator, a delay value, and a priority value.

3. The apparatus of claim 1, the transaction request comprising a remote direct memory access (RDMA) instruction.

4. The apparatus of claim 1, the transaction request comprising a put instruction to write data to the memory or a get instruction to read data from the memory.

5. The apparatus of claim 1, the circuitry to register the transaction in a pending transactions data structure upon receipt of the transaction request, the pending transactions data structure to store one or more of a node identification, a memory range, a retry indicator, a delay value, a transaction identifier, an allocation time, and a priority value for the transaction.

6. The apparatus of claim 1, the circuitry to:
   receive a lock elision identifier from the caching agent with the response; and
   register the transaction in an inflight transactions data structure, the inflight transactions data structure to store one or more of a node identification, a pending retries value, a payload, and the lock elision identifier for the transaction.

7. The apparatus of claim 1, the circuitry to:
   perform a retry attempt of the transaction subsequent to the period of time if the response indicates the transaction does conflict with another transaction, the retry attempt to cause the circuitry to:
   send a second request to the caching agent to perform the transaction,
   receive a second response to indicate whether the transaction conflicts or does not conflict with another transaction, and
   perform the transaction if the second response indicates the transaction does not conflict with another transaction, or delay the transaction for a period of time if the second response indicates the transaction does conflict with another transaction.

8. The apparatus of claim 1, the circuitry to:
   receive another response while performing the transaction indicating the transaction conflicts with another transaction; and
   halt the transaction in response to receiving the other response.

9. The apparatus of claim 1, comprising:
   the caching agent; and
   one or more processing cores operable to generate the other transactions.

10. A computer-implemented method, comprising:
    processing, by circuitry, a transaction request to perform a transaction with a memory, the transaction request comprising a synchronization indication to indicate utilization of transaction synchronization to perform the transaction,
    sending a request to a caching agent to perform the transaction based on the synchronization indication indicating synchronization utilization,
    receiving a response from the caching agent, the response to indicate whether the transaction conflicts or does not conflict with another transaction, and
    performing the transaction if the response indicates the transaction does not conflict with another transaction, or delay the transaction for a period of time if the response indicates the transaction does conflict with another transaction.

11. The computer-implemented method of claim 10, comprising receiving the transaction request from a node via a fabric or network coupled with an interface, the transaction request comprising one or more of a memory range, a retry indicator, a delay value, and a priority value.

12. The computer-implemented method of claim 10, the transaction request comprising a remote direct memory access (RDMA) instruction.

13. The computer-implemented method of claim 10, the transaction request comprising a put instruction to write data to the memory or a get instruction to read data from the memory.

14. The computer-implemented method of claim 10, comprising registering the transaction in a pending transactions data structure upon receipt of the transaction request, the pending transactions data structure to store one or more of a node identification, a memory range, a retry indicator, a delay value, a transaction identifier, an allocation time, and a priority value for the transaction.

15. The computer-implemented method of claim 10, comprising:
    receiving a lock elision identifier from the caching agent with the response; and
    registering the transaction in an inflight transactions data structure, the inflight transactions data structure to store one or more of a node identification, a pending retries value, a payload, and the lock elision identifier for the transaction.

16. The computer-implemented method of claim 10, comprising:
    performing a retry attempt of the transaction subsequent to the period of time if the response indicates the transaction does conflict with another transaction, the retry attempt comprising:
    sending a second request to the caching agent to perform the transaction,
    receiving a second response to indicate whether the transaction conflicts or does not conflict with another transaction, and performing the transaction if the second response indicates the transaction does not conflict with another transaction, or delay the transaction for a period of time if the second response indicates the transaction does conflict with another transaction.

17. The computer-implemented method of claim 10, comprising:
receiving another response while performing the transaction indicating the transaction conflicts with another transaction; and
halting the transaction in response to receiving the other response.

18. A non-transitory computer-readable storage medium, comprising a plurality of instructions, that when executed, enable processing circuitry of to:
process a transaction request to perform a transaction with a memory, the transaction request comprising a synchronization indication to indicate utilization of transaction synchronization to perform the transaction,
send a request to a caching agent to perform the transaction based on the synchronization indication,
receive a response from the caching agent, the response to indicate whether the transaction conflicts or does not conflict with another transaction, and
perform the transaction if the response indicates the transaction does not conflict with another transaction, or delay the transaction for a period of time if the response indicates the transaction does conflict with another transaction.

19. The non-transitory computer-readable storage medium of claim 18, comprising a plurality of instructions, that when executed, enable processing circuitry to receive the transaction request from a node via a fabric or network coupled with an interface, the transaction request comprising one or more of a memory range, a retry indicator, a delay value, and a priority value.

20. The non-transitory computer-readable storage medium of claim 18, the transaction request comprising a remote direct memory access (RDMA) instruction.

21. The non-transitory computer-readable storage medium of claim 18, the transaction request comprising a put instruction to write data to the memory or a get instruction to read data from the memory.

22. The non-transitory computer-readable storage medium of claim 18, comprising a plurality of instructions, that when executed, enable processing circuitry to register the transaction in a pending transactions data structure upon receipt of the transaction request, the pending transactions data structure to store one or more of a node identification, a memory range, a retry indicator, a delay value, a transaction identifier, an allocation time, and a priority value for the transaction.

23. The non-transitory computer-readable storage medium of claim 18, comprising a plurality of instructions, that when executed, enable processing circuitry to:
receive a lock elision identifier from the caching agent with the response; and
register the transaction in an inflight transactions data structure, the inflight transactions data structure to store one or more of a node identification, a pending retries value, a payload, and the lock elision identifier for the transaction.

24. The non-transitory computer-readable storage medium of claim 18, comprising a plurality of instructions, that when executed, enable processing circuitry to:
perform a retry attempt of the transaction subsequent to the period of time if the response indicates the transaction does conflict with another transaction, the retry attempt comprising:
send a second request to the caching agent to perform the transaction,
receive a second response to indicate whether the transaction conflicts or does not conflict with another transaction, and
perform the transaction if the second response indicates the transaction does not conflict with another transaction, or delay the transaction for a period of time if the second response indicates the transaction does conflict with other transaction.

25. The non-transitory computer-readable storage medium of claim 18, comprising a plurality of instructions, that when executed, enable processing circuitry to:
receive another response while performing the transaction indicating the transaction conflicts with another transaction; and
halt the transaction in response to receiving the other response.

* * * * *